(No Model.)
E. B. McINTOSH.
Apparatus for the Manufacture of Glass Pipes.
No. 238,796. Patented March 15, 1881.
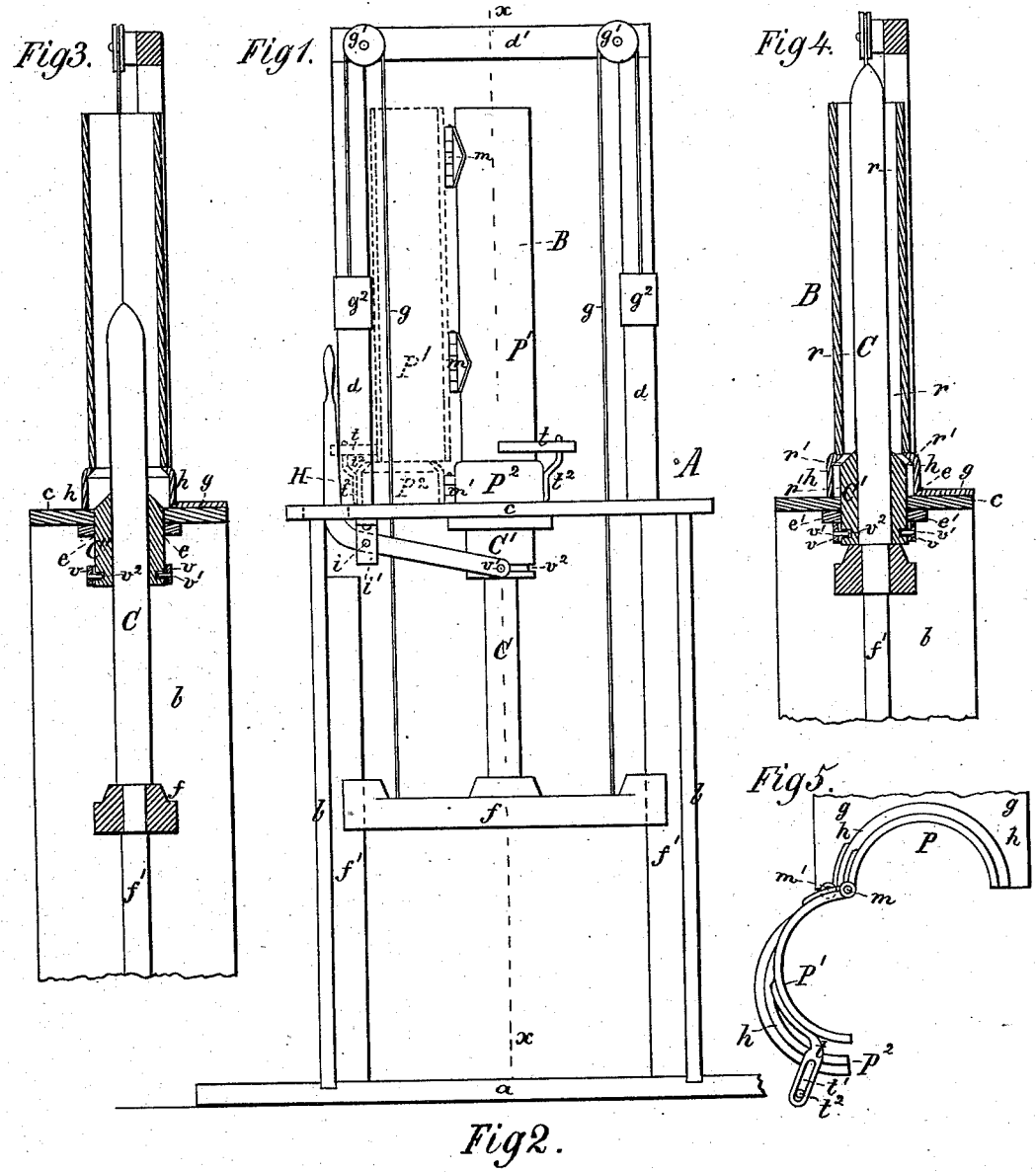

UNITED STATES PATENT OFFICE.

EDWARD B. McINTOSH, OF BROOKLYN, NEW YORK.

APPARATUS FOR THE MANUFACTURE OF GLASS PIPES.

SPECIFICATION forming part of Letters Patent No. 238,796, dated March 15, 1881.

Application filed January 20, 1881. (No model.)

*To all whom it may concern:*

Be it known that I, EDWARD B. MCINTOSH, a citizen of the United States, residing in Brooklyn, Kings county and State of New York, have invented certain new and useful Improvements in Apparatus for the Manufacture of Glass Pipe; and I do hereby declare that the following is a full, clear, and exact description of the construction and operation of the same, reference being had to the annexed drawings, and to the letters and figures of reference marked thereon.

The invention has relation to apparatus for the manufacture of glass pipe; and it consists in the improvements in the construction of such apparatus, as will be hereinafter described and specifically claimed.

Figure 1 of the drawings is a front elevation of my improved apparatus for the manufacture of glass pipe. Fig. 2 is a plan view of the same. Fig. 3 is a vertical section in the line $x\ x$ of Fig. 1, showing the parts in near position preparatory to pouring melted glass into the mold in which the glass pipe is formed; and Fig. 4 is a like section, showing the parts in position immediately after the melted glass has been poured in the mold. Fig. 5 is a plan view of the mold thrown open for the removal of the glass pipe from the mold, as also indicated in dotted lines in figure 1.

The main object of my invention is to provide means whereby, in apparatus adapted for the manufacture of glass pipe, an annular head or cap may be formed upon one end of such pipe and during the act of casting the same, so that one end of one length of pipe can be inserted into the head or cap of another length of similar pipe, and the two be sealed together by suitable sealing substance, if desired, the same as is commonly practiced in iron or other gas and sewer pipes.

In the drawings, A indicates the frame of my said apparatus, having a suitable foundation-piece, $a$, side pieces, $b$, a platform, $c$, to sustain the mold, posts $d\ d$, which rest upon and project upwardly from the platform, and connected at top by a cross-tie, $d'$, as shown by the figures.

B indicates the mold, and C the main plunger, of my improved apparatus. The mold—tubular in form—is seated upon the platform C, and when closed, as shown in solid lines in Fig. 1, and in plan view, Fig. 2, surrounds, at its lower extremity, a circular opening, $e$, through the platform, as represented. Beneath and attached to the platform and around and concentric with such opening is an annular ring-piece, $e'$, which, in conjunction with the circular wall of the opening $e$, serves to give steadiness of action to the vertical movement of an auxiliary plunger, C', which closely fits around the main plunger C. The main plunger C at its lower end is seated in a cross-support, $f$, the ends of which are grooved so as to overlap guides $f'$, applied to the side pieces, $b$, of the frame A, and thus give steadiness and directness of movement to the main plunger C when forced upward from its position as shown in Figs. 1 and 3 to its position as shown in Fig. 4. Such movement of the plunger C, I in this instance effect by means of ropes $g$ $g$ attached at one end to the cross-piece $f$, and provided at their other ends with weights $g^2$, the cords being passed over pulley-wheels $g'$, at the top of the frame A. Any other suitable means may be employed for giving movement to the plunger C during the act of molding the glass pipe.

The auxiliary plunger C'. it will be seen, is made to closely fit around the main plunger C, and at the same time it is capable of being moved up and down thereon. The movement of the plunger C' is effected through a bent lever, H, which passes through a slot cut through the platform $c$, and is pivoted at $i$ to a supporting-bracket, $i'$, attached to the under side of the platform. This hand-lever at one end is forked, the forks $v$ being provided with pintles $v'$, which engage with an annular groove, $v^2$, cut in the lower end of the plunger C', as shown. By this means, when the hand-lever is drawn from its position shown in Fig. 1 the plunger C' can be forced from its position shown in Figs. 1 and 3 into its position as shown in Fig. 4, said plunger C' during such act being moved up along the main plunger C and into the mold B, as shown in Fig. 4.

The wall of the mold B, I construct in three or more parts, to wit: a stationary part, P, a hinged part, P', and a hinged part, P², below P'. These parts are shown closed together in the plan view, Fig. 2, and thrown open in the like view, Fig. 5. The part P constitutes the rear half of the wall of the mold, and at its bottom terminates in a base-plate, $g$, screwed to the platform $c$, thus holding this portion of the mold firmly in position. The lower portion of this half, as indicated at $h$, is made of greater diameter or dimension than the remaining portion above it, as shown. The hinged part P' constitutes a front half of the wall of the mold above the lower extended portion, $h$, of the stationary rear half, P, and is hinged to the rear half, P, as indicated at $m\ m$. The hinged part P² constitutes another portion of the wall of the mold, and corresponds in dimension and construction precisely with the lower extended portion, $h$, of the rear half, P, of the mold, and is hinged to said rear half at $m'$; and thus, when these several parts, P P' P², are closed together as indicated in solid lines in Fig. 1 and in plan view, Fig. 2, and the main plunger C and auxiliary plunger C' are forced into position, as shown in Fig. 4, there will be within the mold B a space, $r$, around the plunger C, and a space, $r'$, around the plunger C', which will be occupied by the melted glass after being poured into the mold, and so form a glass tube corresponding to the space $r$, with a head or cap thereon corresponding to the space $r'$.

It will be seen by Fig. 2 and by solid lines in Fig. 1 that when the parts P P' P² are closed together the portion of the mold which incloses the said space $r$ is of less diameter than the base portion $h$ which incloses the said space $r'$, and that said parts are not hinged in the same vertical line, and hence that if the parts P' and P² were rigidly connected together they could neither be swung open nor closed with the hinges $m$ and the hinge $m'$ as axes for such articulation. To provide for the simultaneous opening and closing of the parts P' P² upon the rear half, P, of the mold, which is very desirable, a horizontally-projecting arm, $t$, is attached to the part P', while beneath such projecting arm a vertical rod, $t^2$, attached to the part P² of the mold, extends upwardly, as shown in dotted lines in Fig. 1, and enters the slot $t'$ of the arm $t$, as indicated in Figs. 1, 2, and 5. This slot $t'$, being made of a length at least equal to the distance between the axial line of the hinges $m$ and the axial line of the hinge $m'$, allows the said parts P' P² to be either simultaneously thrown open or closed, the upper end of the rod $t^2$ freely articulating in the slot $t'$ during such acts.

In operation, the several parts of the mold may at the commencement, for example, be in the position signified in solid lines in Fig. 1 and in sectional view in Fig. 3. The melted glass is now poured into the top of the mold and flows down around the plunger C and upon and around the cone-shaped end of the auxiliary plunger C', thus filling all unoccupied space inclosed by the wall of the mold. The plunger C, meantime, is made to ascend by setting in action the cords $g$, weighted at $g^2$, and while the plunger C rises from its position shown in Fig. 3 to its position shown in Fig. 4, passing up through the plunger C' during such act, the lever H is drawn upon by the operator, so as to force the auxiliary plunger C' up from its position shown in Fig. 3 to its position shown in Fig. 4, thereby forming a glass tube of a uniform diameter in the mold above its base portion $h$, and with a head or cap of greater diameter between the auxiliary plunger C' and said portion $h$. Having allowed the glass tube to cool within the mold, the plungers C C' are then forced back to a position in which their upper ends will be flush, or nearly so, with the upper surface of the platform $c$, thus allowing the glass tube to be removed from the mold after the parts P' P² are thrown open.

Preparatory to pouring the molten glass into the mold the plungers C C' may be only slightly projected into the mold, and with their upper conical ends in near proximity to each other.

I am aware that in the art of casting glass cylinders two half-molds have been employed which would admit of being thrown open in order to release the casting; also, that a main plunger has been made to ascend within the mold during the act of pouring the molten glass around it; also, that an annular piston with a loose ring upon it, and located in the annular space between a stationary core and a surrounding mold, has been used, upon which, at the top of the mold, to pour the molten glass, the piston and ring descending during the pouring of the glass until the bottom of the mold is reached; also, that two half-molds have been used within which to cast glass cylinders with a cap or collar upon one end.

I claim—

1. The lower removable part, P², of the mold, in combination with the stationary part P and removable part P', substantially as described.

2. In a machine for molding glass pipe, the combination of the auxiliary plunger C', main plunger C, and mold B, said mold having its base portion $h$ of greatest diameter, and one section of the wall forming this portion of greatest diameter hinged, as at $m'$, out of the vertical line of the hinges $m$ of the mold, substantially as described.

3. The slotted arm $t'$, in combination with the mold B, whereby the hinged part P² of the mold is allowed to open and close simultaneously with the part P' without straining or binding upon the hinges, substantially as and for the purpose described.

Signed in presence of two subscribing witnesses.

EDWARD B. McINTOSH.

Witnesses:
HENRY ARDEN,
A. J. FALLON.